Sept. 16, 1941.  H. H. REPLOGLE  2,255,810
MARKED MEAT PRODUCT
Filed May 5, 1939
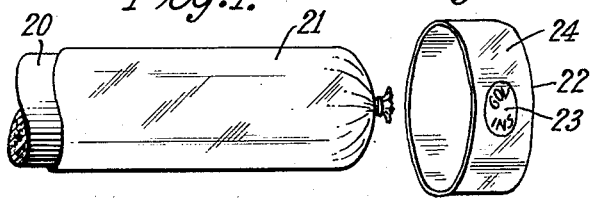
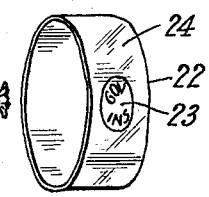
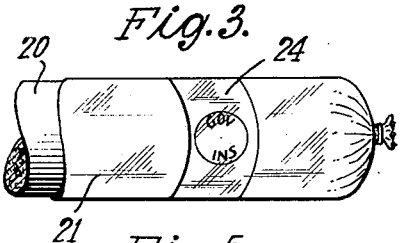
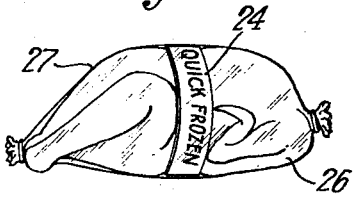
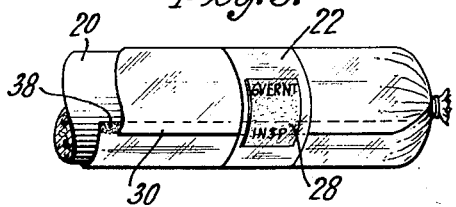
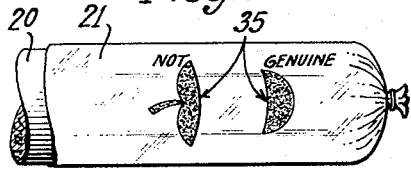
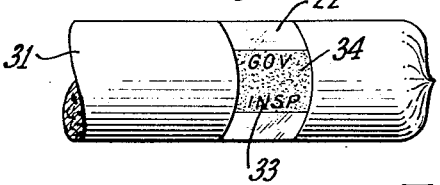
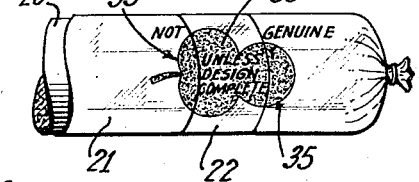
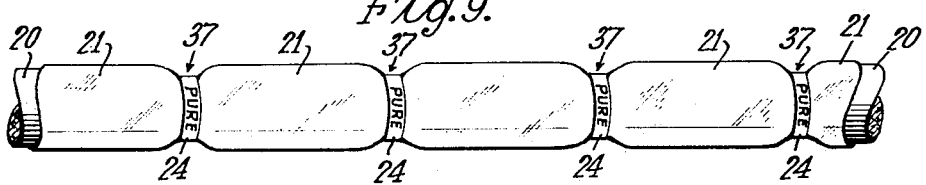
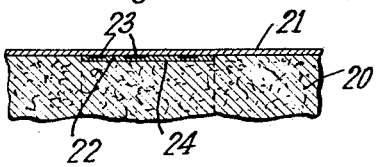
INVENTOR
HARRY H. REPLOGLE
BY Worth Wade
ATTORNEY

Patented Sept. 16, 1941

2,255,810

UNITED STATES PATENT OFFICE 2,255,810

MARKED MEAT PRODUCT

Harry H. Replogle, Scarsdale, N. Y., assignor to Sylvania Industrial Corporation, Fredericksburg, Va., a corporation of Virginia Application May 5, 1939, Serial No. 271,828

1 Claim. (Cl. 99—174)

This invention relates in general to the production of meat products and in particular to a process for producing marked stuffed sausages, and the like, and includes correlated improvements designed to enhance the production and utility of these products.

Heretofore in the manufacture of meat products, in particular sausages, the marking of the products has been effected by means of tags. The tags are fastened to the meat products by strings which often break or become torn, defaced or mutilated. If the tags are affixed to the meat product or its wrapper by means of adhesive, it is necessary to use an adhesive which will withstand the expansion and contraction of the sausage during curing or ageing, and the handling during shipping, in order to prevent the tag from becoming dislodged.

It is a general object of the invention to provide a marked meat product which overcomes the difficulties and disadvantages heretofore presented.

It is a further object of the present invention to produce a meat product bearing insignia or other identifying means which are capable of resisting effacement and which will adhere during production and shipping of the product.

A specific object of the invention is to provide a marked stuffed sausage from which the marking cannot be removed without revealing its removal, thus discouraging tampering and adulteration.

Another general object of the invention is to provide a method for the production of a marked meat product in a simple and economical manner.

A further specific object of the invention is to provide a method of inspecting and marking meat products during the course of manufacture.

Other objects of the invention will in part be obvious and will in part appear hereinafter.

According to the present invention a marked cured meat product is produced by taking a shaped meat mass, or by forming meat into a shaped mass, and applying to the mass an insignia comprising a seamless band of shrinkable material bearing indicia, shrinking the insignia band about the mass and subjecting the meat to a curing treatment. The expression "curing" or "curing treatment" as used in the description and claims includes cooking, smoking, freezing, or a plurality of these treatments, or other suitable treatments by which meat may be preserved. The application of the insignia band to the meat mass may take place before, during or after encasing the meat and before, during or after any curing operation. In the preferred embodiment, however, meat is enclosed in a casing, and the insignia band in a swollen state is applied to the encased meat and the step of shrinking the insignia band about the mass preferably takes place during the smoking, drying or freezing of the mass whereby the swelling agent is evaporated from the swollen band during the dehydration of the product thus causing the band to shrink.

For a more complete understanding of the nature and objects of the invention, reference should be had to the attached drawing in which:

Fig. 1 represents a fragmentary view of a sausage in a semi-finished condition;

Fig. 2 represents a perspective view of one embodiment of the insignia of the invention before application to a meat product;

Figs. 3, 4, 5 and 6 represent various embodiments of the marked meat product of the invention;

Figs. 7 and 8 represent two views of a further embodiment of a stuffed sausage of the invention before and after completion, respectively;

Fig. 9 represents a fragmentary view of a continuous link of sausage in which the insignia serve to divide the product into units; and Figs. 10 and 11 are fragmentary views in section of two other embodiments of the marked meat products of the invention.

According to the invention, the article comprises a shaped mass of meat bearing insignia. Among the meat products which may be subjected to treatment in accordance with the invention are animal carcasses, sausage, fowl carcasses, fish, steaks, chops, cuts and the like, which may or may not be suitably encased in a wrapper. For purposes of illustration, the invention will be described in connection with the production of marked sausage and fowl carcasses. The insignia of the invention comprises a seamless band and indicia, the band being non-fibrous hydrophilic organic material, capable of swelling and shrinking and thus being capable of following the expansion and contraction of the shaped meat mass without becoming loose on the product. The insignia may comprise reading matter or designs such, for example, as notices, advertisements, trade-marks, seals, government inspection stamps and analysis of contents. In particular, the present method of marking is especially adapted for applying government inspection notices to meat products.

The band may be formed from a variety of non-fibrous film-forming organic colloids, in particular hydrophilic film-forming colloids such, for example, as regenerated cellulose and alkali soluble cellulose alkyl ethers, alkali-soluble cellulose hydroxy alkyl ethers, salts of cellulosic glycolic acid, and other cellulose compounds which swell in water; also from casein, gelatine and water-swelling resins such, for example, as water-swelling low polymerized vinyl resins, urea resins, urea-formaldehyde resins, acrylic acid resins and partially condensed glucose ureideformaldehyde resin, and the like. The regenerated cellulose may be derived from the partial or complete denitration of nitrocellulose, de-esterified cellulose acetate, viscose, solutions of cellulose in cuprammonia and other cellulose solvents. The bands may be formed from film-forming hydrophobic organic colloids which are, for example, cellulose esters, cellulose ethers and synthetic resins which are soluble or swellable in organic solvents such, for example, as cellulose acetate, benzyl cellulose and high polymerized resins of the classes above mentioned. Such bands may be formed by the extrusion of one of these substances through an annular orifice into a tube, coagulating and purifying the tube and severing the tube transversely into bands.

Bands of various diameters and widths may be used in the invention as the size of the meat product dictates. The diameter of the band however may vary over a wide range, but preferably the size suitable for a particular purpose will be that of the diameter of the mass of meat at a desired point on the mass, and usually of slightly smaller dry diameter than the mass of meat at that point.

The indicia may be incorporated with the band at any convenient time during the formation of the band itself as by impregnation or coating, or the formed band may be printed or embossed. The band, casing, meat and insignia may be suitably decorated and printed as desired at any state of the process in a manner known to the art. Such indicia may be borne on either or both sides of the band. Further, indicia may be carried by separate label or other indicia-bearing sheet material disposed beneath the band, and may or may not be affixed thereto. The insignia are applied to the meat product while the band is in a wet and/or gel state. The band may be in the wet or gel state by reason of not having been dried in the manufacture, but if dried the band is preferably treated with a suitable swelling agent known in the art, depending upon the nature of the material used to form the band.

The casing for the meat product may comprise any fibrous or non-fibrous sheet material or pellicle such, for example, as textile, paper or any of the non-fibrous film-forming organic colloids from which the band is made as above described. Preferably the casing and insignia band are made of the same or of a similar material so that the band will not be readily distinguishable from the casing when applied to the product. Further, in the preferred embodiment of the invention, both the casing and band are transparent so that indicia disposed on the band appears to be borne by the casing.

In general, the insignia comprising bands bearing indicia may be shrunk over and in direct contact with the meat, in which case a casing may be applied thereafter; or, the insignia may be shrunk about the outside of a casing which encloses a meat product. Methods of application to a meat product may include applying insignia to the sausage during the process of stuffing meat into a casing or after stuffing of the sausage meat, but previous to or during smoking and/or the curing of the product; or application to the finished product after the curing, freezing, drying and/or finishing of the meat product in the usual manner known to the art.

Alternatively, the meat product may be provided with a casing which can be either seamless, as shown in Figs. 1, 3, 6, 7 and 8, or with a seamed casing, as shown in Fig. 5. The seamed casing may be prepared from a sheet of one of the materials above described folded over so that the longitudinal edges overlap to form a seam 30 which may be united with a suitable adhesive 38, as shown in Fig. 5. Alternatively, a seamed casing may be made in a known manner by spirally winding a strip of sheet material with overlapping edges, and sealing the edges.

The invention is also applicable for marking meat products which have been initially stuffed in casings and the casing removed after a partial or complete curing. The meat product may be molded or formed in such a manner that no casing is required to keep its form and shape, for example, sausages and the like which have been molded and cured in metal molds.

Fig. 1 shows one embodiment of a portion of a sausage having a casing 21 broken away to show sausage meat 20 inside the casing. The embodiment shown is in readiness to receive insignia.

Fig. 2 illustrates one embodiment of the insignia 24 of the invention showing a shrinkable band 22 bearing indicia 23, the band being in a swollen or gel state.

In carrying out the process of the invention, a meat product such, for example, as sausage meat 20, is enclosed in a suitable casing 21 as by stuffing the meat into a wet casing formed of regenerated cellulose. At any stage in the process of manufacture, as during or after stuffing or during or after any cooking, curing and packing step, the meat product is inspected and there is applied to the product an insignia 24 comprising a seamless band of shrinkable material, such as regenerated cellulose bearing indicia, the band being swollen with a volatile swelling agent, such as water. After application of the insignia to the meat product, the band is caused to dry, whereupon it shrinks tightly on the product, thus conforming generally to the shape of the product where applied. By way of example, a finished sausage is illustrated in Fig. 3 and comprises sausage meat 20 enclosed in a casing 21 bearing insignia 24.

The insignia bands shrink tightly into contact with the casing over their entire contiguous surfaces so that when the band and the casing are made of the same or similar material they are substantially indistinguishable in appearance and seem to form a part thereof and can be detected only upon close examination.

The insignia 24, as shown in Fig. 4, may be disposed about a meat product while the band is in a swollen state and then shrunk thereon, such as about the fowl carcass 26. Wrapper 27 may then be wrapped or placed about the fowl carcass and suitably fastened. If desired, a fowl carcass may be enclosed in a wrapper prior to the application of the insignia, in which case the insignia will appear on the outside of the wrapped fowl carcass.

Another embodiment of the invention is illustrated in Fig. 5 which shows a label 28 bearing suitable indicia disposed beneath and held in place by a transparent band 22 shrunk tightly around the sausage meat 20. In the embodiment of the invention illustrated the indicia is separate and apart from the band of the insignia.

Fig. 6 shows a further embodiment of the invention. The indicia 33 is applied over an area 34 of the band 22 which has been rendered opaque or colored by impregnating the band with an insoluble pigment or by printing the surface with an opaque or colored substance. The area 34 thus forms a background for the indicia and enhances its appearance.

To produce a tamperproof meat product the insignia may be separated into two parts (Figs. 7 and 8). In this embodiment a portion of the indicia 35 is disposed on the casing 21 which encloses the sausage meat 20 (Fig. 7), and the remainder of the indicia 36 is disposed on the band 22, as shown in Fig. 8, the relation of the parts of the indicia being such that when the band is disposed properly on the casing, the combination will form a complete word, sentence, design or seal. Thus when the band 22 bearing part of the indicia 36 is not applied, or is removed or destroyed, the insignia will be incomplete and will therefore signify that the sausage has not passed inspection or that it has been tampered with.

Fig. 9 shows another embodiment of the invention where insignia 24 may be placed about a continuous link of sausage 20 at predetermined intervals, and shrunk thereon thus causing constrictions 37 of the meat product. For this purpose the insignia bands 22 are selected so that their dry diameters will be considerably less than the outside diameter of the sausage. When the insignia are then swollen and placed about the mass of meat while they are in the gel state, they subsequently shrink upon drying to constrict the sausage at the spaced points 37. The predetermined intervals between insignia may be chosen in order to represent units of mass or length. For example, each interval may substantially represent a unit of one pound. The entire sausage link may then be encased or wrapped by a suitable covering material, such as casing 21, or on the other hand, it may have been covered prior to the application of the insignia. A convenient way of designating the exact location of a unit of mass may be suggested by the following example. A sausage casing of predetermined and uniform wall thickness throughout is marked off at intervals with arrows, lines, markings or by suitable means to designate the units of mass of sausage meat to be stuffed therein. After stuffing, the insignia are swollen, placed about the stuffed link and then allowed to shrink over the lines or such markings. If the bands of the insignia are of transparent material, the vendor selling the meat product may make his cut to bisect the mark, and thus be able to cut portions of sausage equivalent to a predetermined mass of meat.

Another variation of the invention is shown in section in Fig. 10. In this embodiment the insignia 24 is disposed beneath a casing 21 and next the meat 20, with the indicia 23 on the surface of the band 22. Thus the indicia which is contiguous to the casing cannot be removed by handling, alteration or defacement.

Fig. 11 illustrates a fragmentary view in section of a band 22 disposed around the sausage meat 20 bearing indicia 23 on the under surface of the band and in contact with the meat itself. The indicia 23 in this instance cannot be scratched off or removed. In this example the meat is not provided with a casing. Furthermore, the indicia may be of such a nature that it will by contact gradually impregnate the meat and impart suitable markings or identification to the meat.

When the band of the insignia is formed from the same material as the sausage casing it presents an unusually attractive appearance especially when used in combination with the casing. In such instance the band disposed about the casing can scarcely be distinguished from the casing itself, and accordingly enhances the neatness and appearance of the sausage product.

The insignia when formed of cellulose hydrate, for example, are not easily removed from the product of the invention because of the peculiar property of that material to shrink tighter at the edges than throughout the central portion. Therefore, the edges bind tighter to the meat, and as a consequence prevent the insignia from becoming subject to easy tear, damage and/or removal. Furthermore, when insignia are made of the same material as the casing which is disposed about the meat, the insignia will have the same coefficient of expansion and contraction as that of the casing. Thus the insignia expands, contracts, swells, shrinks and acts in the same manner and to the same degree and extent as the casing when undergoing changes of moisture and temperature and thus remaining affixed to the product as an integral part thereof.

The insignia may bear all the printed matter and/or indicia necessary for a particular meat product so that the casing or meat need not be marked separately. Since casings are more expensive to print than bands, a saving may be accomplished. However, re-use of the insignia can be prevented by a combination in forming designs, indicia, etc., between the insignia and the encased meat.

If the indicia is applied to the inside surface of a band of transparent non-fibrous cellulose, for example, not only will it forestall attempted removal, alteration or defacement, but the index of refraction of the band will also impart a desirable gloss to the indicia as seen through the band material and so enhance the appearance of the indicia.

The application of shrinkable insignia to a meat encased in a seamed casing will, for example, so reinforce the casing that when the insignia is shrunk thereon it will tend to prevent such casing from bursting at the seam.

If insignia are torn or cut from the product, they cannot be replaced without evidence thereof. Removal of insignia can also be detected because the shrinking of the band produces a slight depression in the surface of the meat product.

Since certain changes in carrying out the above process and certain modifications in the article which embody the invention may be made without departing from its scope, it is intended that all matter contained in the above description or shown in the accompanying drawing shall be interpreted as illustrative and not in a limiting sense.

Having described my invention, what I claim as new and desire to secure by Letters Patent is:

As an article of manufacture, a marked meat product comprising a mass of meat, a casing of non-fibrous, shrinkable, cellulosic material enclosing said meat and bearing indicia which forms an incomplete insignia, a band of the same non-fibrous, shrinkable, cellulosic material encircling and shrunk about said casing and bearing indicia directly thereon which forms with the indicia on said casing a complete insignia.

HARRY H. REPLOGLE.